(12) United States Patent
Nikolic et al.

(10) Patent No.: US 8,657,916 B2
(45) Date of Patent: Feb. 25, 2014

(54) PYROMETALLURGICAL METHOD

(75) Inventors: Stanko Nikolic, Brisbane (AU); Martin Lluis Bakker, Brisbane (AU); Gerardo Raul Fernando Alvear Flores, Brisbane (AU)

(73) Assignee: Xstrata Technology Pty Ltd, Brisbane (AU)

( * ) Notice: Subject to any disclaimer, the term of this patent is extended or adjusted under 35 U.S.C. 154(b) by 0 days.

(21) Appl. No.: 13/809,383

(22) PCT Filed: Jul. 6, 2011

(86) PCT No.: PCT/AU2011/000854
§ 371 (c)(1),
(2), (4) Date: Feb. 8, 2013

(87) PCT Pub. No.: WO2012/006660
PCT Pub. Date: Jan. 19, 2012

(65) Prior Publication Data
US 2013/0145901 A1 Jun. 13, 2013

(30) Foreign Application Priority Data
Jul. 15, 2010 (AU) ................................ 2010903158

(51) Int. Cl.
*C22B 7/04* (2006.01)
*C04B 5/06* (2006.01)

(52) U.S. Cl.
USPC .................................... 75/392; 75/628; 65/19

(58) Field of Classification Search
USPC ........................................ 75/392, 628; 65/19
See application file for complete search history.

(56) References Cited

U.S. PATENT DOCUMENTS

| | | | |
|---|---|---|---|
| 3,853,540 A | 12/1974 | Schlatter et al. | |
| 4,300,949 A | 11/1981 | Ushakov et al. | |
| 4,445,932 A | 5/1984 | Onischin et al. | |
| 4,448,604 A | 5/1984 | Day et al. | |
| 5,443,619 A | 8/1995 | McDoulett, Jr. et al. | |
| 5,865,872 A * | 2/1999 | Krofchak et al. | ............ 75/10.35 |
| 2008/0236334 A1 * | 10/2008 | Meyn | ............................. 75/328 |

FOREIGN PATENT DOCUMENTS

CN 1128802 A 8/1996

OTHER PUBLICATIONS

International Search Report, PCT/AU2011/000854, mailed Sep. 12, 2011.
Roset, Greg K., et al., "Converting Practices at the Stillwater Precious Metals Smelter", 1992 Review of Extractive Metallurgy, pp. 39-42.

* cited by examiner

*Primary Examiner* — George Wyszomierski
*Assistant Examiner* — Tima M McGuthry Banks
(74) *Attorney, Agent, or Firm* — Winston & Strawn LLP

(57) ABSTRACT

A method for the pyrometallurgical processing of sulphide material containing nickel using a fluxing composition that includes calcium. The fluxing composition forms a slag having an Fe/CaO ratio of between about 0.5 and 5.0 by weight and an $SiO_2$/Fe ratio of less than 0.2 by weight.

16 Claims, 4 Drawing Sheets

PYROMETALLURGICAL METHOD

FIELD OF THE INVENTION

The present invention relates to a pyrometallurgical method for the treatment of metal ores. In particular, the present invention relates to a pyrometallurgical method including a fluxing composition for use in the continuous smelting and converting of nickel ores.

BACKGROUND ART

During the pyrometallurgical treatment (for instance, smelting or converting) of metal ores or metal concentrates, fluxing agents are often used to assist in the removal of unwanted contaminants from the metal or matte produced. In some smelting and converting systems (such as nickel smelting or converting) fluxing agents, such as silica, are used to produce an iron silicate slag.

A drawback with the use of silica as a fluxing agent is that the silicate slag formed in the furnace or crucible, may not have the correct physical and chemical properties (such as low viscosity, high solubility of impurities, low solubility of valuable metals) under certain conditions. This results in the loss of valuable metal to the slag, the inclusion of impurities in the metal or matte, or a combination of the two.

Thus, there would be an advantage if it were possible to provide a fluxing composition that assisted in the production of a metallurgically stable slag with a combination of physical and chemical properties that benefits the metallurgical performance of the process.

It will be clearly understood that, if a prior art publication is referred to herein, this reference does not constitute an admission that the publication forms part of the common general knowledge in the art in Australia or in any other country.

Throughout this specification, the term "comprising" and its grammatical equivalents shall be taken to have an inclusive meaning unless the context of use indicates otherwise.

SUMMARY OF THE INVENTION

It is an object of the present invention to provide a fluxing composition which may overcome at least some of the above-mentioned disadvantages, or provide a useful or commercial choice.

In a first aspect, the invention resides broadly in a method for the pyrometallurgical processing of nickel-containing material using a fluxing composition comprising calcium.

Any suitable fluxing composition comprising calcium may be used, however it is preferred that, once in the slag phase, the fluxing composition forms a calcium-ferrite based slag ($CaO-FeO-Fe_2O_3$).

It is envisaged that a number of calcium compounds could be used for the fluxing composition, including limestone, lime or burnt lime, or a combination thereof. In a preferred embodiment, however, the fluxing composition may comprise calcium carbonate.

In some embodiments of the invention, the fluxing composition may comprise more than about 10% by weight of calcium carbonate. Preferably, the fluxing composition may comprise more than about 50% by weight of calcium carbonate. In alternative embodiments, the fluxing composition may comprise more than about 90% by weight of calcium carbonate. In some embodiments, the fluxing composition may comprise 100% by weight of calcium carbonate. In a preferred embodiment of the invention the fluxing composition comprises limestone. It will be understood that in embodiments of the invention in which limestone is used, the limestone may comprise virtually 100% calcium carbonate, or may be predominantly calcium carbonate with a relatively small amount of unavoidable impurities therein.

A skilled addressee would understand that the addition of calcium for the purpose of flux may be achieved by various methods including, but not limited to, the addition of relatively coarse calcium carbonate particles (for instance, gravel-sized particles), or the pneumatic injection of fine particles of burnt lime (e.g. as a dust).

Any suitable nickel-containing material may be used in the method of the present invention. For instance, the nickel-containing material may include nickel ores, concentrates, mattes, slags or the like, or any suitable combination thereof.

It is envisaged that the method of the present invention may be utilised in connection with any suitable pyrometallurgical process, such as, but not limited to, smelting, refining, converting and the like.

In some embodiments of the invention, the fluxing composition may be the only fluxing agent added to the pyrometallurgical process. Alternatively, additional fluxing agents may be added to the pyrometallurgical process as well as the fluxing composition. In this embodiment of the invention, it is envisaged that any suitable additional fluxing agents may be used.

The fluxing composition may be classified prior to use. Preferably, if classification is required, the classification of the fluxing composition is on the basis of particle size. Any suitable classification process may be used, such as, but not limited to screening.

Preferably, the classification of the fluxing composition is performed to reduce or eliminate fine particles in the fluxing composition, a substantial proportion of which would be lost from the process as particulate emissions. The loss of calcium carbonate in this manner is likely to result in a CaO-deficient slag.

The particle size split at which the classification of the fluxing composition is carried out is not critical, and a skilled addressee will understand that the particle size split may vary depending on the pyrometallurgical process, the nature of the fluxing composition, the nature of the nickel-containing material and so on.

Any suitable quantity of fluxing composition may be added to the pyrometallurgical process. Preferably, however, the quantity of fluxing composition added to the pyrometallurgical process is chosen so as to optimize the metallurgical performance of the process.

It has surprisingly been found that the distribution of nickel and cobalt in the slag produced by the pyrometallurgical process decreases with a decreasing ratio of Fe/CaO in the slag. Thus, in a preferred embodiment of the invention, the quantity of the fluxing composition added to the pyrometallurgical process is determined based on a desired Fe/CaO ratio in the slag. This ratio may be determined based on a knowledge of the iron content of the nickel-containing material.

In a preferred embodiment, the desired ratio of Fe/CaO (by weight) in the slag is between about 0.5 and 5.0. More preferably the desired ratio of Fe/CaO (by weight) in the slag is between about 2.0 and 4.0. Most preferably, the desired ratio of Fe/CaO (by weight) in the slag is between about 2.2 and 3.0 (as indicated by the shaded region of the phase diagram illustrated in FIG. 5).

In addition, in some embodiments of the invention, a ratio of Fe/CaO in the slag may result in a greater distribution of nickel and/or cobalt in the slag, for instance due to entrainment with other minerals such as, but not limited to, magnetite.

In a preferred, embodiment of the invention, the method of the present invention is a continuous process. This is particularly the case when the pyrometallurgical process is converting. Specifically, it is envisaged that the processing of feed and the injection of oxidant into the furnace is carried out on a continuous basis.

The present invention provides a number of significant advantages. Firstly, it has been found that, advantageously, lower concentrations of iron in the matte produced by the pyrometallurgical process may be achieved when a calcium-ferrite slag system according to the present invention is used.

Secondly, the explosive, fast-rising slag foaming experienced in conventional iron silicate slag systems (see. for instance, Roset. G. K. Matousek. J. W & Marcantonio, P. J., "Converting Practices at the Stillwater Precious Metals Smelter". JOM. April 1992) may be reduced or eliminated, thereby reducing the occupational health and safety risks posed to workers.

Thirdly, the present invention allows a nickel converting process to be operated as a continuous process rather than a batch process, thereby increasing the efficiency of the process as well as the recovery of nickel and cobalt.

Fourthly, the present invention may result in an improved recovery of valuable metals, such as nickel, copper and cobalt, to the matte. Thus, the performance of the pyrometallurgical process may be improved through the use of the present invention.

Fifthly, the present invention may result in improved matte metallization, resulting in lower matte sulfur concentrations and higher concentrations of nickel and cobalt.

BRIEF DESCRIPTION OF THE DRAWINGS

An embodiment of the invention will be described with reference to the following drawings in which.

Figure 1:
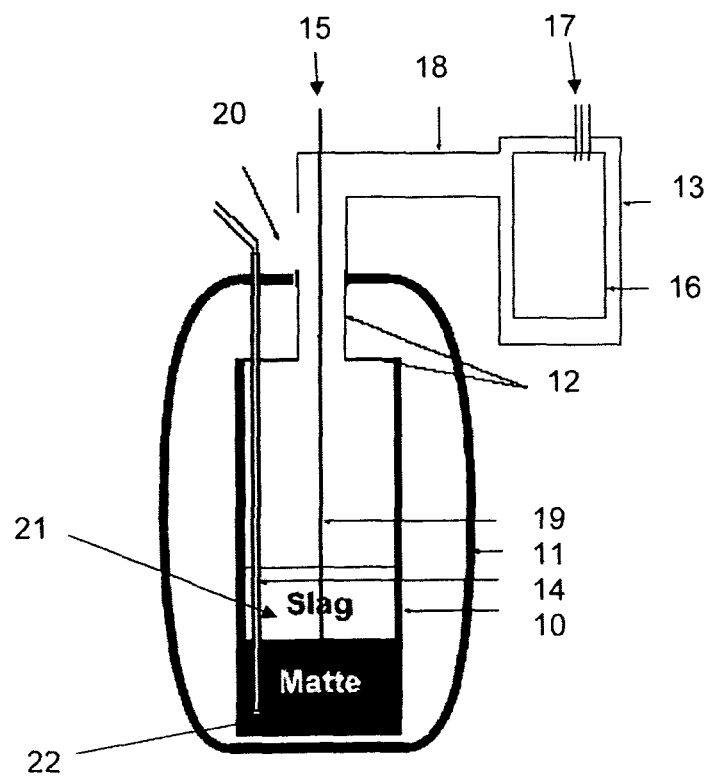
FIG. 1 illustrates a schematic diagram of the setup of a crucible-scale test.

It will be appreciated that the drawings have been provided for the purposes of illustrating preferred embodiments of the present invention and that the invention should not be considered to be limited solely to the features as shown in the drawings.

EXAMPLES

Crucible-Scale Tests

A schematic diagram of the crucible set-up is shown in FIG. 1.

Crucible-scale experiments were performed using dense magnesia crucibles 10, which were heated through a graphite susceptor 11 in an induction furnace. The crucible top and chimney 12 was placed under a slight negative pressure using a vacuum 17 to vent the exhaust gases and fumes through a steel flue 18 to a mini-baghouse 13 comprising a filter 16. The temperature of the crucible contents was measured with an 'R' type thermocouple 14, which was housed within a magnesia sheath. Air 15 was used as the oxidative gas for converting.

During sampling and/or stoppages, the top of the furnace was covered with a shroud of nitrogen gas. The air flow rate was controlled by an electronic mass flow controller through an alumina tube lance 19 of internal diameter of either 3 min or 5 mm.

The starting slag bath 21 for the crucible tests was sourced from a synthetic calcium-ferrite slag. The synthetic slag was modified to the desired Fe/CaO ratio for each experiment. During converting, limestone and primary smelting matte were added gradually throughout each experiment through the feed port 20. The lance 19 was submerged through the slag later and into the matte 22.

Samples of slag were taken with a dip bar, and matte samples were taken with a quartz vacuum tube. Samples were taken 5, 10, 15 and 30 minutes into the experiment and then every 30 minutes after that. Samples were ground and analysed, with matte samples being analysed by inductively coupled plasma optical emission spectroscopy (ICP-OES) and slag samples being analysed by X-ray fluorescence (XRF).

Pilot-scale Tests

Pilot-scale tests were conducted using a pilot ISAS-MELT™ facility comprising a cylindrical furnace with an internal diameter of approximately 300 mm. The furnace vessel was lined with chrome-magnesite refractory bricks, which were backed with high alumina bricks and a kaowool lining.

A mass flow controller was used to inject predetermined quantities of natural gas, air and oxygen into the bath via a 29 mm inner diameters stainless steel lance. The feed, comprising primary smelting matte, coal and limestone, was added in known amounts through the top of the furnace.

Removal of the products was achieved by opening a single taphole at the base of the furnace and collecting the materials in cast iron ladles. The furnace was drained completely between experiments.

Process off-gases passed through a drop-out box and an evaporative gas cooler, before being directed through a baghouse and a caustic soda scrubber for removal of dust and sulfur-containing gases prior to venting to a stack.

Bath temperature was measured continuously using a thermocouple placed through the refractory lining of the furnace. Confirmation of the bath temperature was obtained using an optical pyrometer, a dip-tip measurement during tapping or a dip-tip measurement of the slag through the top of the furnace.

The starting slag bath for the pilot-scale tests was sourced either from a synthetic calcium-ferrite slag or from the crushed slag of a previous test.

During converting, samples were taken using a dip bar. Spoon samples of both matte and slag were taken during tapping. Samples were ground and analysed, with matte samples being analysed by inductively coupled plasma optical emission spectroscopy (ICP-OES) and slag samples being analysed by X-ray fluorescence (XRF). The sulfur content of selected slag samples, and all matte samples, was analysed using a LECO device.

Figure 6:
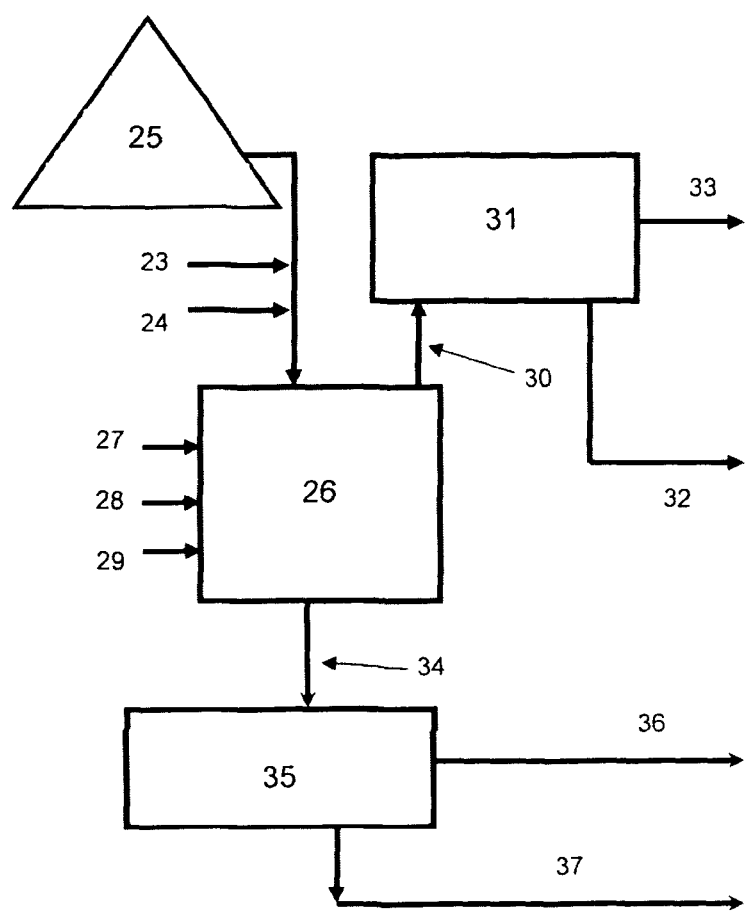
FIG. 6 illustrates a schematic diagram of the setup of a pilot-scale test apparatus.

A schematic diagram of the pilot plant flowsheet is shown in FIG. 6. In this Figure, flux 23 and coal 24 is added to a primary smelter matte 25 which was then fed to a pilot-scale furnace 26. The furnace 26 may be of any suitable form although in the present examples, the furnace 26 was an ISASMELT™/ISACONVERT™ furnace.

Air 27, oxygen 28 and fuel 29 is added to the furnace 29 to aid the pyrometallurgical process.

Offgases and dust 30 exits the furnace 26 and is treated by gas quenching and cleaning 31 to separate the dust for dust collection 32 from the gases which are vented through a stack 33.

Matte and slag 34 exits the furnace and is treated by slow cooling and separation 35 in order to separate nickel matte 36 from slag 37.

Feed Materials

The composition of the feed matte for the crucible-scale and pilot-scale tests is set out in Table 1.

TABLE 1

Composition of feed primary smelting matte

| Feed Matte Sample | Co | Cu | Fe | Ni | S | Si | Total |
|---|---|---|---|---|---|---|---|
| Average Composition | 2.61 | 10.6 | 24.6 | 41.6 | 17.3 | 0.14 | 96.8 |
| Standard Deviation | 0.42 | 1.68 | 1.73 | 2.82 | 2.68 | 0.18 | 1.47 |

Limestone, sourced from Mount Isa, was used as a flux for the trials. The typical composition of limestone is shown below in Table 2:

TABLE 2

Composition of Limestone Flux (wt %)

| $CaCO_3$ | $Al_2O_3$ | $Fe_2O_3$ | $SiO_2$ | Total |
|---|---|---|---|---|
| 93.7 | 0.80 | 1.10 | 4.40 | 100.0 |

Coal was used as a supplementary fuel during the tests. The proximate analysis of this material is shown in Table 3, the ultimate analysis of this material is shown in Table 4, and the ash composition of the material is shown in Table 5.

TABLE 3

Proximate analysis and calorific value of coal
(db = dry basis and ar = as received)

| Moisture (ar %) | Ash (db %) | Volatiles (db %) | Fixed carbon (db %) | Gross dry calorific value (MJ/kg) | Gross wet calorific value (MJ/kg) | Net Wet calorific value (MJ/kg) |
|---|---|---|---|---|---|---|
| 7.9 | 2.6 | 2.1 | 95.3 | 33.0 | 30.3 | 30.0 |

TABLE 4

Ultimate analysis of coal (dry basis %)

| C | H | N | Cl | S | O | Total |
|---|---|---|---|---|---|---|
| 92.9 | 1.00 | 0.64 | 0.03 | 0.22 | 2.6 | 97.4 |

TABLE 5

Composition of ash in coal (wt %)

| $SiO_2$ | $Al_2O_3$ | $Fe_2O_3$ | $TiO_2$ | $K_2O$ | MgO | $Na_2O$ | CaO | $SO_3$ | $P_2O_5$ | $CO_2$ | Total |
|---|---|---|---|---|---|---|---|---|---|---|---|
| 24.5 | 10.6 | 17.8 | 0.69 | 0.78 | 9.7 | 9.0 | 4.4 | 18.7 | 0.0 | <0.01 | 96.6 |

Test Results

Three crucible-scale tests were conducted at the conditions illustrated in Table 6.

TABLE 6

| Experiment Number | Temperature | Fe/CaO ratio (wt %/wt %) | Fe in matte target | Matte feed rate (g/hr) | Limestone flux feed rate (g/hr) | Air flow rate (L/min) | Planned time (hours) |
|---|---|---|---|---|---|---|---|
| 1 | 1350° C. | 4.0 | 4.0 | 250 | 26.1 | 1.26 | 4 |
| 2 | 1350° C. | 4.0 | 2.0 | 250 | 27.8 | 1.61 | 4 |
| 3 | 1300° C. | 3.6 | 2.0 | 250 | 32.0 | 1.62 | 4 |

During the final 40 minutes of operation, the furnace was allowed to cool under nitrogen bubbling to determine whether foaming would occur. The slag viscosity increased significantly during this period, but no slag foaming was observed. The results of the crucible-scale tests are shown in Table 7.

TABLE 7

Composition of matte samples from crucible-scale tests

| Sample | Matte Analysis (wt %) | | | | | |
|---|---|---|---|---|---|---|
| | Fe | Ni | Cu | Co | S | Total |
| C1 | 4.49 | 61.8 | 11.4 | 1.90 | 16.6 | 96.3 |
| C2 | 5.05 | 57.9 | 11.3 | 2.41 | 18.3 | 95.0 |
| C3 | 3.99 | 58.6 | 12.2 | 2.16 | 18.7 | 95.8 |

| Sample | Slag Analysis (wt %) | | | | |
|---|---|---|---|---|---|
| | Fe/CaO | Ni | Cu | Co | S |
| C1 | 3.69 | 3.06 | 0.81 | 1.25 | 0.95 |
| C2 | 3.18 | 2.63 | 0.73 | 1.48 | 0.92 |
| C3 | 2.47 | 2.28 | 0.54 | 1.52 | 0.56 |

Twelve pilot-scale tests were performed under the conditions shown in Table 8:

TABLE 8

Pilot-scale test conditions

| Trial # | Temperature | Fe/CaO ratio (wt %/wt %) | Fe in matte target | Matte feed rate (kg/hr) | Limestone flux feed rate (kg/hr) | Coal feed rate (kg/hr) | $CH_4$ flow rate ($Nm^3/hr$) | $O_2$ flow rate ($Nm^3/hr$) |
|---|---|---|---|---|---|---|---|---|
| 1 | 1300° C. | 4.0 | 4.0 | 100 | 10.7 | 12 | 10 | 5.74 |
| 2 | 1300° C. | 4.0 | 2.0 | 120 | 11.4 | 12 | 10 | 7.65 |
| 3 | 1300° C. | 4.0 | 2.0 | 150 | 11.4 | 0 | 6 | 9.57 |
| 4 | 1300° C. | 4.0 | 2.0 | 150 | 11.4 | 0 | 6 | 10.8 |
| 5 | 1360° C. | 4.0 | 2.0 | 150 | 11.4 | 6 | 6 | 9.49 |
| 6 | 1360° C. | 4.0 | 2.0 | 150 | 11.4 | 6 | 6 | 10.6 |
| 7 | 1360° C. | 3.6 | 2.0 | 150 | 12.7 | 6 | 6 | 14.9 |
| 8 | 1360° C. | 3.8 | 2.0 | 150 | 12.7 | 6 | 6 | 15.7 |
| 9 | 1360° C. | 3.6 | 2.0 | 150 | 12.7 | 6 | 6 | 15.7 |
| 10 | 1360° C. | 3.6 | 2.0 | 150 | 12.7 | 6 | 6 | 17.5 |
| 11 | 1380° C. | 3.4 | 2.0 | 150 | 14.0 | 6 | 6 | 17.5 |
| 12 | 1380° C. | 3.6 | 2.0 | 120 | 14.0 | 6 | 6 | 13.2 |

The results of these tests are-set out in Table 9.

TABLE 9

Composition of matte and slag samples from pilot-scale tests

| Trial # | Temp ±30° C. | Final Matte Analysis (wt %) | | | | | | Final Slag Analysis (wt %) | | | | |
|---|---|---|---|---|---|---|---|---|---|---|---|---|
| | | Fe | Ni | Cu | Co | S | Total | Fe/CaO | Ni | Cu | Co | S |
| 1 | 1350° C. | 4.14 | 63.7 | 12.6 | 2.12 | 15.8 | 98.4 | 3.33 | 8.30 | 1.62 | 2.15 | 0.45 |
| 2 | 1300° C. | 4.07 | 62.2 | 11.2 | 2.43 | 17.8 | 97.7 | 3.26 | 5.80 | 1.07 | 1.83 | 0.86 |
| 3 | 1300° C. | 6.00 | 60.1 | 10.9 | 2.71 | 16.7 | 96.4 | 3.80 | 4.26 | 0.93 | 2.06 | 0.42 |
| 4 | 1300° C. | 8.10 | 59.7 | 12.0 | 3.24 | 16.6 | 99.6 | 3.66 | 4.08 | 0.92 | 1.60 | 0.66 |
| 5 | 1360° C. | 6.30 | 60.3 | 11.6 | 2.83 | 15.9 | 96.9 | 3.65 | 5.70 | 1.07 | 2.00 | 0.36 |
| 6 | 1370° C. | 4.81 | 61.7 | 12.1 | 2.62 | 15.8 | 97.0 | 3.77 | 7.00 | 1.71 | 2.29 | 0.52 |
| 7 | 1380° C. | 5.50 | 65.7 | 15.6 | 1.45 | 12.1 | 100.4 | 3.65 | 9.10 | 1.75 | 2.78 | 0.22 |
| 8 | 1380° C. | 2.84 | 65.8 | 15.1 | 2.02 | 14.3 | 99.9 | 4.84 | 12.80 | 1.88 | 2.89 | 0.18 |
| 9 | 1380° C. | 5.30 | 62.0 | 12.7 | 2.73 | 16.3 | 99.0 | 4.07 | 8.90 | 1.67 | 2.19 | 0.60 |
| 10 | 1390° C. | 3.14 | 65.1 | 14.9 | 1.98 | 14.6 | 99.7 | 4.21 | 11.40 | 2.33 | 2.69 | 0.37 |
| 11 | 1420° C. | 5.70 | 61.3 | 12.6 | 2.86 | 16.4 | 98.9 | 2.87 | 8.20 | 1.65 | 1.78 | 0.20 |
| 12 | 1380° C. | 3.66 | 64.3 | 14.1 | 2.21 | 15.4 | 99.7 | 2.49 | 5.40 | 1.70 | 1.60 | 0.20 |

In the first test, a target Fe/CaO ratio of 4.0 was selected to avoid the precipitation of dicalcium-silicate. Initial assays showed that the $SiO_2$ concentration of the slag was approximately 2 wt %. Thus, a revised target Fe/CaO ratio of 3.6 was chosen for the remaining trials.

The ratio of feed matte to injected oxygen was adjusted throughout the testwork based on assays from preceding tests.

The temperatures reported are direct measurements of bath temperature that were taken during the period in which the slag phase was in contact with the thermocouple sheath. These measurements were confirmed with dip tip measurements of the slag through the furnace roof and on the molten phase tapped from the vessel.

Morphology of Slag in Pilot-Scale Tests

Where possible, granulated samples of the slag phase were taken during the pilot-scale tests. These samples were prepared for viewing under a scanning electron microscope (SEM).

Figure 2:
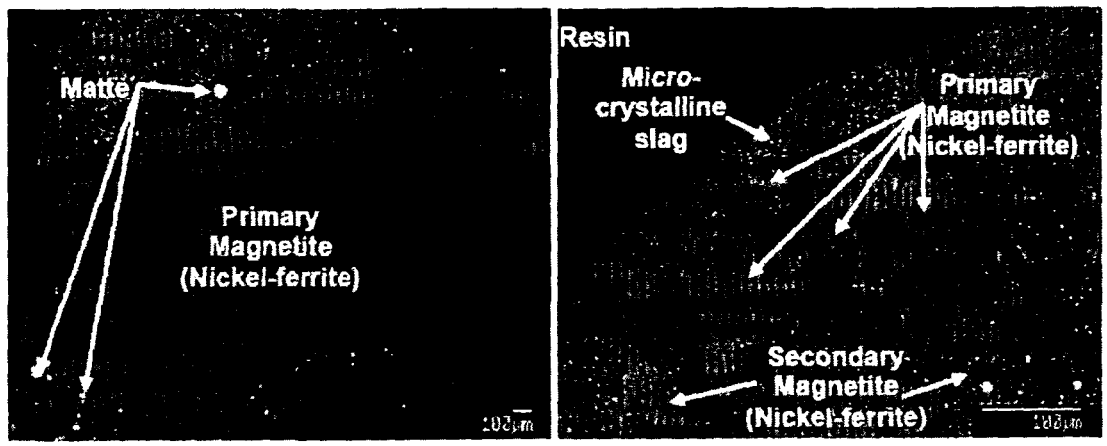
FIG. 2 illustrates scanning electron microscope micrographs of a granulated slag sample at an Fe/CaO ratio of 5.1.
Figure 3:
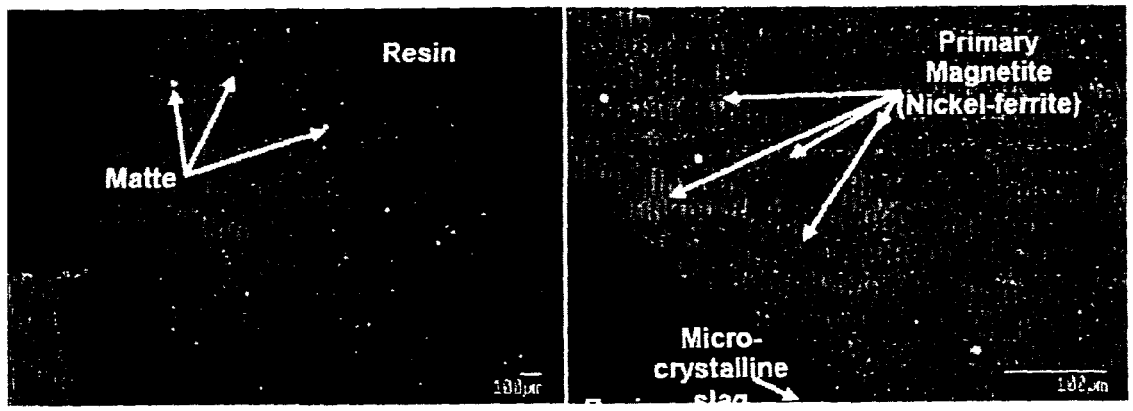
FIG. 3 illustrates scanning electron microscope micrographs of a granulated slag sample at an Fe/CaO ratio of 3.8.
Figure 5:
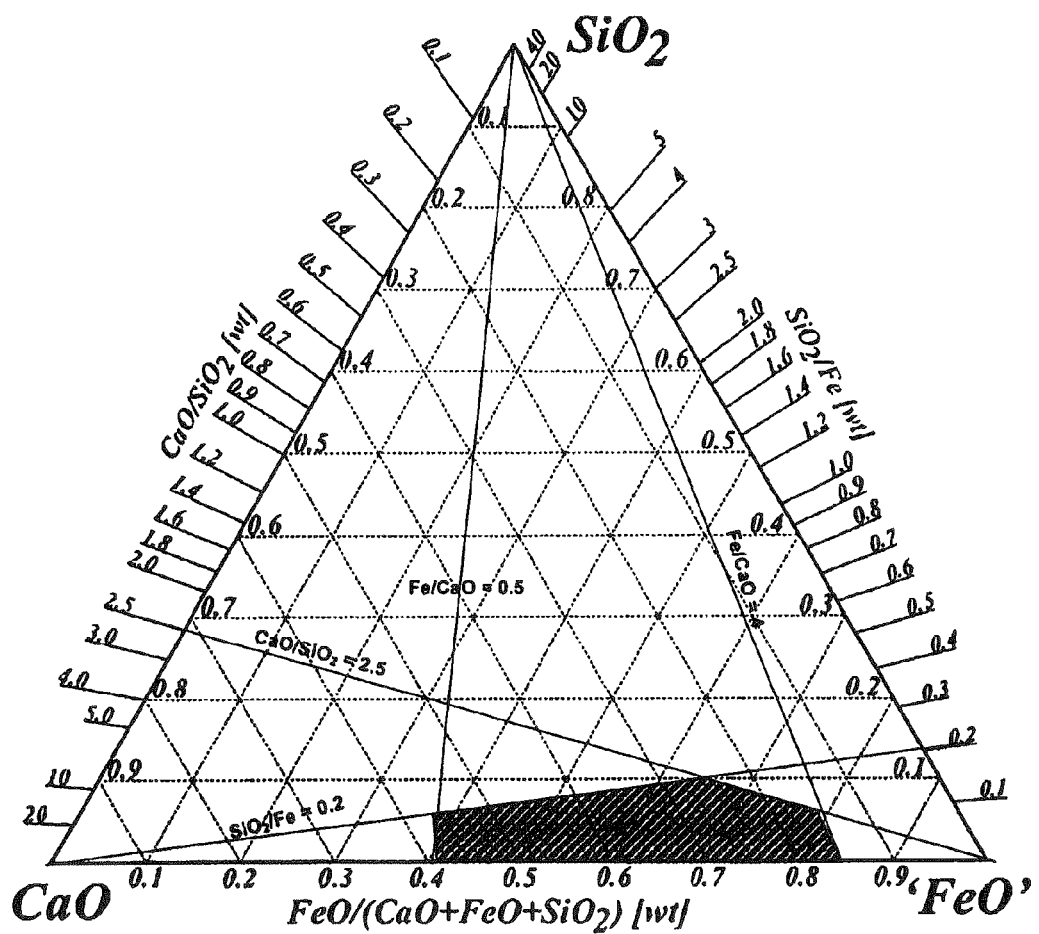
FIG. 5 illustrates an FeO—CaO—$SiO_2$ phase diagram including a shaded area corresponding to the preferred region of operation of the present invention.

In FIG. 2, SEM micrographs of a granulated slag sample at an Fe/CaO ratio of 5.1 (Trial 8 in Table 9) are shown, while in FIG. 3, SEM micrographs of a granulated slag sample at an Fe/CaO ratio of 3.8 (Trial 4 in Table 9) is shown. In FIG. 5. SEM micrographs of a granulated slag, sample at an Fe/CaO ratio of 2.4 (Trial 12 in Table 9) is shown.

Figure 4:
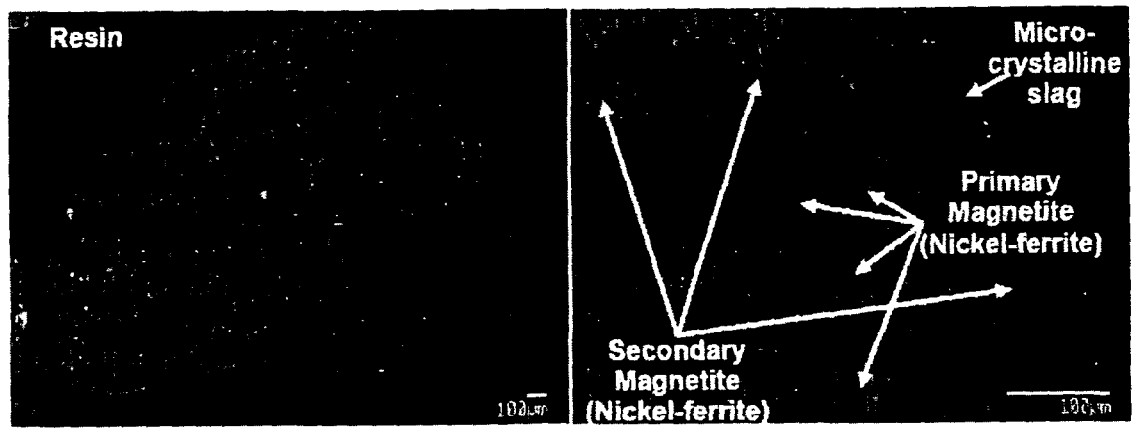
FIG. 4 illustrates scanning electron microscope micrographs of a granulated slag sample at an Fe/CaO ratio of 2.4.

The micrographs of FIGS. 2-4 illustrate that the only solid species in the granulated samples was magnetite (spinel/nickel ferrite) phase. This indicates that from Fe/CaO ratios of 2.4 to 5.1, the system is in the magnetite primary phase field.

The nickel concentration in the magnetite phase was above 20 wt % for trials 8 and 12, with a composition approaching nickel ferrite ($NiOFe_2O_3$). The iron content of the matte was less than 4 wt % in these trials. The solid magnetite of trial 4 had a lower concentration of nickel and was closer to the composition of pure magnetite ($FeO.Fe_2O_3$). This may be attributed to the higher concentration of iron in matte and hence lower nickel in slag in this trial.

The large magnetite particles observed in FIG. 4 were analysed along the grain and found to be of the same composition as the smaller particles, confirming that they were formed during converting.

High nickel concentration in solid magnetite may be the cause of the decreasing nickel concentration in slag with decreasing Fe/CaO ratio. Lowering the Fe/CaO ratio lowers the liquidus temperature of the slag and therefore the percentage of solid magnetite in the slag.

Those skilled in the art will appreciate that the present invention may be susceptible to variations and modifications other than those specifically described. It will be understood that the present invention encompasses all such variations and modifications that fall within its spirit and scope.

What is claimed is:

1. A method for the pyrometallurgical processing of sulphide material containing nickel using a fluxing composition comprising calcium, wherein the fluxing composition forms a slag having an Fe/CaO ratio of between about 0.5 and 5.0 by weight and an $SiO_2$/Fe ratio of less than 0.2 by weight, wherein the processing is carried out on a continuous basis.

2. The method according to claim 1 wherein the slag is a calcium-ferrite based slag.

3. The method according to claim 1 wherein the fluxing composition comprises calcium carbonate.

4. The method according to claim 1 wherein the fluxing composition comprises limestone.

5. The method according to claim 1 wherein the sulphide material is a nickel ore, concentrate, matte, slag or a combination thereof.

6. The method according to claim 1 wherein the pyrometallurgical process in which the method is used is smelting, converting or refining.

7. The method according to claim 1 wherein the fluxing composition is classified prior to use in the pyrometallurgical process.

8. The method according to claim 7 wherein the fluxing composition is classified on the basis of particle size.

9. A method for the continuous pyrometallurgical processing of sulphide material containing nickel using a fluxing composition comprising calcium, wherein the fluxing composition forms a slag having an Fe/CaO ratio of between about 0.5 and 5.0 by weight and an $SiO_2$/Fe ratio of less than 0.2 by weight, wherein feed material and oxidant are continuously supplied into a furnace to form the slag.

10. The method according to claim 9 wherein the slag is a calcium-ferrite based slag.

11. The method according to claim 9 wherein the fluxing composition comprises calcium carbonate.

12. The method according to claim 9 wherein the fluxing composition comprises limestone.

13. The method according to claim 9 wherein the sulphide material is a nickel ore, concentrate, matte, slag or a combination thereof.

14. The method according to claim 9 wherein the pyrometallurgical process in which the method is used is smelting, converting or refining.

15. The method according to claim 9 wherein the fluxing composition is classified prior to use in the pyrometallurgical process.

16. The method according to claim 15 wherein the fluxing composition is classified on the basis of particle size.

* * * * *